Figure 1:
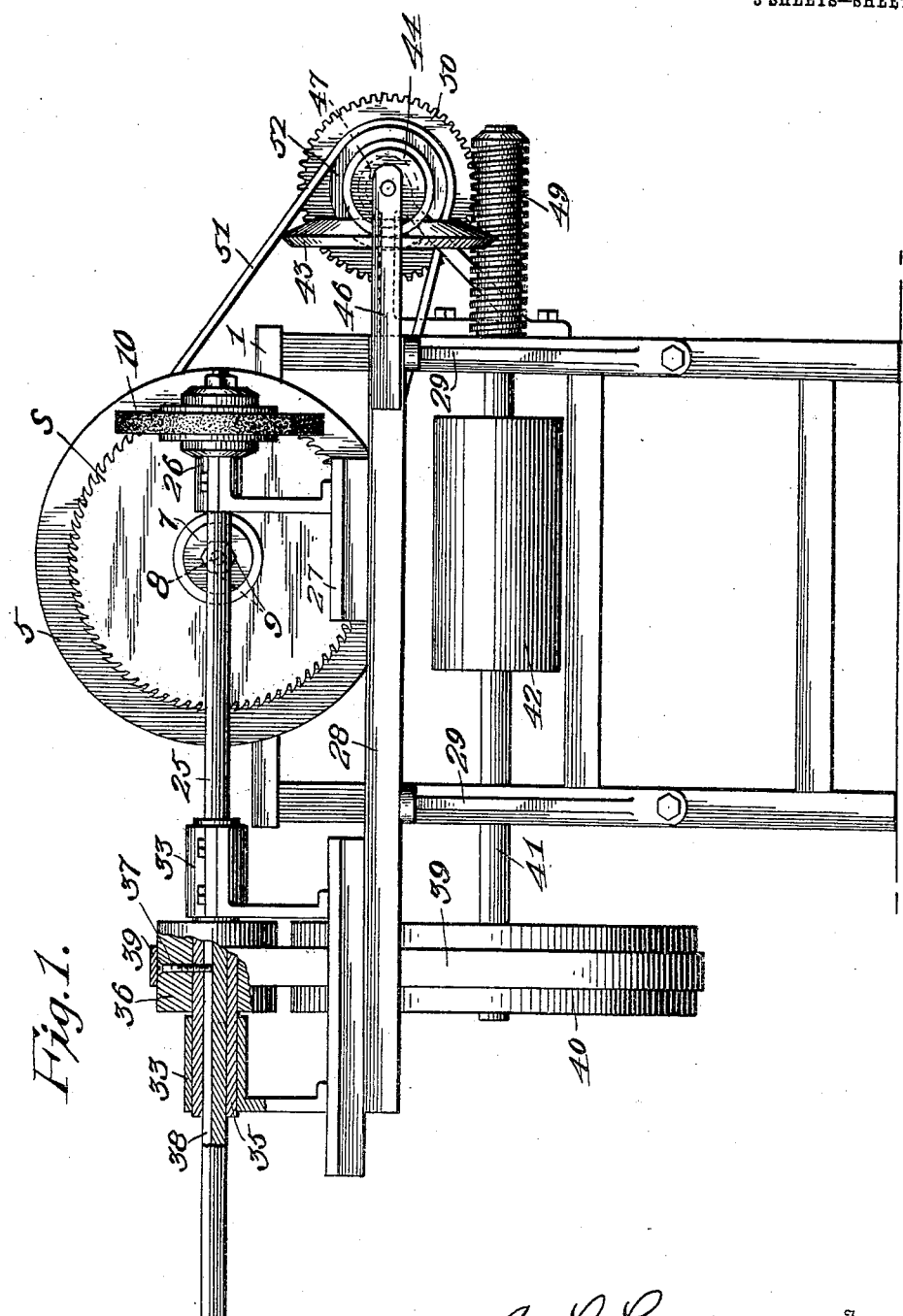

A. L. LAWING.
SAW GRINDING MACHINE.
APPLICATION FILED NOV. 7, 1908.

931,777.

Patented Aug. 24, 1909.
3 SHEETS—SHEET 1.

Witnesses
James F. Crown
Nina L. Martin

Inventor
A. L. Lawing
By Walson E. Coleman
Attorney

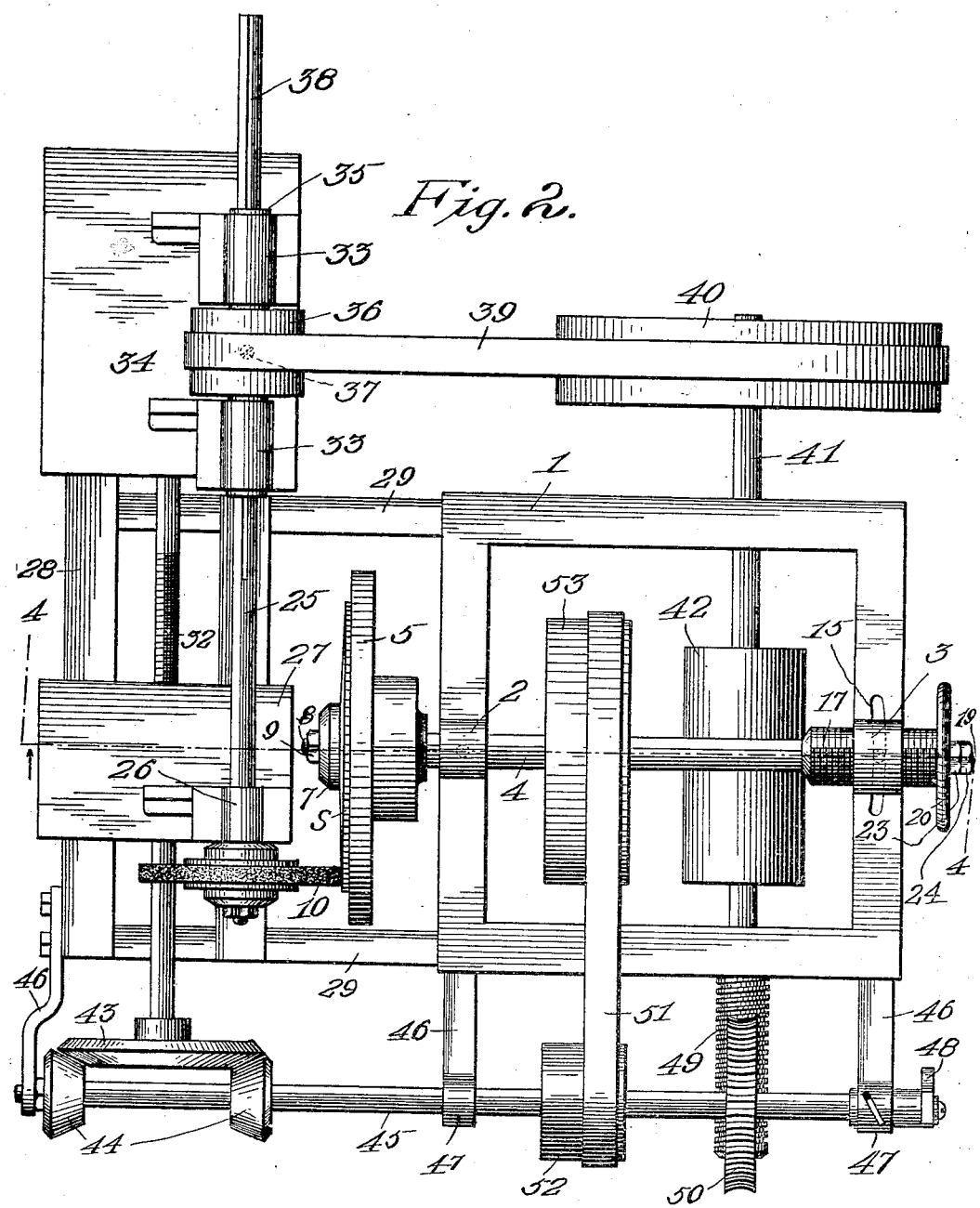

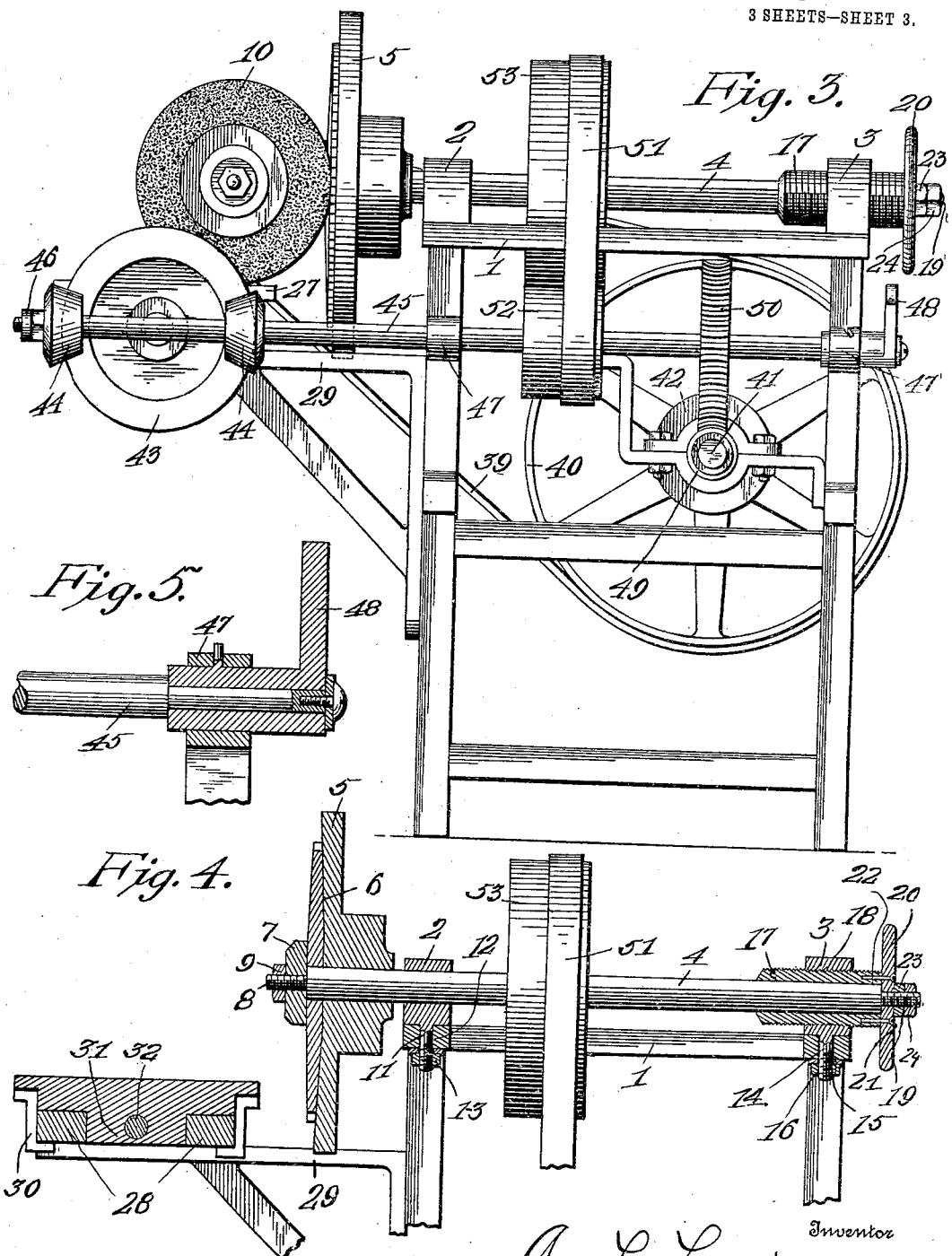

UNITED STATES PATENT OFFICE.

ALFRED L. LAWING, OF LEBANON, TENNESSEE.

SAW-GRINDING MACHINE.

931,777.  Specification of Letters Patent.  Patented Aug. 24, 1909.

Application filed November 7, 1908. Serial No. 461,552.

*To all whom it may concern:*

Be it known that I, ALFRED L. LAWING, a citizen of the United States, residing at Lebanon, in the county of Wilson and State of Tennessee, have invented certain new and useful Improvements in Saw-Grinding Machines, of which the following is a specification, reference being had to the accompanying drawings.

This invention relates to improvements in metal grinding machines and more particularly to one for regrinding saws and performing analogous work.

The object of the invention is to improve and simplify the construction and operation and machines of this character and thereby render the same durable and efficient.

With the above and other objects in view, the invention consists of the novel features of construction and the combination and arrangement of parts hereinafter fully described and claimed, and illustrated in the accompanying drawings, in which—

Figure 1 is a front elevation of the improved machine, parts being broken away and in section; Fig. 2 is a top plan view; Fig. 3 is an end elevation; Fig. 4 is a vertical section taken on the plane indicated by the line 4—4 in Fig. 2; and Fig. 5 is a detail longitudinal section through the cam device.

The invention comprises a main frame 1 preferably of open rectangular form and having adjustable bearings 2, 3 for a revolving shaft 4 which carries the saw S or other piece of work to be operated upon. The saw may be secured to the shaft in any suitable manner, but as illustrated, it is arranged upon a circular face plate 5 fixed to the forward end of the shaft 4, said face plate being preferably formed with a slightly concaved outer face 6 against which the saw is clamped by means of a clamping disk 7 held upon the reduced screw threaded end 8 of the shaft 4 by means of a clamping nut 9.

10 denotes an emery wheel or the like mounted, as presently explained, to travel across the face of the saw or other piece of work and in order to properly position the saw with respect to the emery wheel, means are provided for shifting the shaft 4 longitudinally toward and from the wheel and also for swinging it angularly. The means for swinging or shifting the shaft angularly in a horizontal plane is effected by providing the front bearing 2 for said shaft with a pivot stud 11 which depends from the bottom of said bearing and is rotatable in a vertical opening 12 formed in the forward top bar of the frame 1. A washer and a nut 13 are provided upon the projecting threaded end of the pivot stud or pin 11 for the purpose of retaining the bearing upon the frame. The other or rear bearing 3 for the shaft 4 is provided upon its bottom with a similar depending pin or stud 14 which is arranged to move in an arc-shaped slot 15 formed in the rear top bar of the frame 1. Said slot 15 is concentric with the pivot opening 12 upon the front top bar of the frame, as shown more clearly in Fig. 1.

A clamping nut 16 is arranged upon the projecting threaded end of the stud 4 and when tightened it serves to clamp the bearing 3 in an adjusted position upon the frame. When the nut 16 is loosened the shaft 4 may be arranged angularly upon the frame by shifting the bearing 3, as will be readily understood.

The shaft 4 is adapted to slide longitudinally in the bearing 2 as well as to rotate therein and its rear end is rotatably but non-slidably arranged in a sleeve 17 externally screw threaded and arranged in a screw threaded opening 18 in the bearing 3. Said shaft 4 is prevented from moving longitudinal in the sleeve 7 by forming its rear end with a reduced screw threaded stem 19 on which is arranged a circular disk or plate 20 which is fixed to the end of the sleeve 7 by screws 21 and which serves as a hand wheel to rotate said sleeve. The hand wheel or disk 20 engages an annular shoulder 22 formed on the shaft by reducing its end 19 and it is retained in engagement with said shoulder by a nut 23 and the latter is locked by a supplemental or locking nut 24.

It will be seen upon reference to Fig. 4, that the parts just described provide a swiveled connection between the rear end of the shaft 4 and the sleeve 17 so that when the hand wheel 20 is turned said sleeve will move through the bearing 3 and carry the shaft 4 with it, but at the same time said shaft can rotate freely within the sleeve. By operating the hand wheel 20 the shaft 4 may be shifted longitudinally for the purpose of moving the saw S toward or from the emery wheel 10.

The emery wheel 10 is suitably clamped or fixed to one end of a shaft 25 arranged in a plane at substantially right angles to the longitudinal axis of the shaft 4 and journaled at one end in a bearing 26 upon a carriage 27 which travels upon a suitable track and is actuated by a feed screw. The track for the carriage is preferably composed of two spaced track bars 28 secured to brackets 29 upon the front portion of the frame 1. The carriage 27 rests upon the track bars and is retained thereon by plates 30 secured to its sides and adapted to project under the track bars, as clearly shown in Fig. 4. Upon the bottom of the carriage is a depending portion 31 which enters between the track bars and is formed with a screw threaded opening to receive a feed screw shaft 32. The shaft 25 of the emery wheel has its end on which said wheel is secured rotatably mounted in the bearing 26 on the carriage, as above explained, and its other end is supported and slidably mounted in spaced bearings 33 arranged upon a supporting plate 34 secured to the extended ends of the track bars 28. Said end of the shaft 25 slides longitudinally in a sleeve 35 rotatably arranged within the bearings 33 and secured to a pulley 36 which is arranged between said bearings. A screw 37 passes through the pulley 36 and the sleeve 35 to unite them and its inner end projects into a longitudinal groove 38 formed in the shaft 25 so that said screw also serves as a key to lock the pulley to the shaft for rotation therewith and at the same time permits the shaft to move longitudinally through the sleeve. The pulley 36 is connected by a belt 39 to a pulley 40 on a main drive shaft 41 suitably journaled in the lower portion of the main frame 1. The shaft 41 may be driven in any suitable manner but it is preferably connected to a power shaft of a belt (not illustrated) which passes around a broad pulley 42 secured to its central portion.

The feed screw shaft 32 which extends through and operates the nut 31 on the carriage 27 is journaled in suitable bearings between the track bars 28 and has fixed to one end a beveled friction wheel 43 adapted to mesh with either of two beveled pinions 44 fixed to a shaft 45 journaled in bearing brackets 46 upon the frame. The shaft 45 has a slight longitudinal sliding movement as well as its rotary movement in said bearings, so that either of the pinions 44, which are disposed at diametrically opposite points with respect to the wheel 43, may be moved into frictional contact with said wheel while the other is simultaneously moved out of such contact. By means of this arrangement of gears, it will be seen that the shaft 45 will drive the feed screw in either direction according to which of the pinions is in frictional contact with the wheel 43. To permit the shaft 45 to be conveniently shifted in a longitudinal direction, a cam device 47 is arranged in one of the bearings 46 and actuated by a hand lever 48. The shaft 45 is driven by a worm gearing consisting of a worm 49 fixed to the shaft 41 and in mesh with a worm gear 50 fixed to the shaft 45.

The shaft 4 is preferably driven from the shaft 45 by a belt 51 passed around a pulley 52 on the shaft 45 and a pulley 53 on the shaft 4.

In operation, the saw or other work to be ground is secured to the face plate or work holder 5 and the bearing 3 is adjusted to give the shaft 4 the proper angle with respect to the grinding wheel, and the hand wheel 20 is manipulated to properly position the work with respect to said wheel. Power is then applied to the shaft 41 so that the emery wheel 10 will be rotated and at the same time moved across the face of the saw or work by means of the feed screw 32.

While the machine is especially adapted for regrinding saws, it will be seen that it may be used for analogous purposes.

While I have shown and described in detail the preferred embodiment of the invention, it will be understood that I do not wish to be limited to the precise construction set forth and that various changes in the form, proportion, arrangement and minor details may be resorted to without departing from the spirit or sacrificing any of the advantages of the invention.

Having thus described the invention what is claimed is:

1. In a machine of the character described, a support, a shaft carrying a work holder, a pivoted bearing for one end of said shaft, a bearing for the other end of said shaft slidable in an arc concentric with the pivot of the first mentioned bearing, a rotatable grinding wheel to travel across the work on said holder and means for adjusting the shaft longitudinally in its bearings.

2. In a machine of the character described, a support, a reciprocatory carriage thereon provided with a rotary grinding wheel, bearings, a shaft rotatable in said bearings and extending in a plane at right angles to the plane of reciprocation of said carriage, said shaft carrying a work holder and means whereby said shaft may be adjusted angularly to dispose its longitudinal axis at different angles with respect to the plane of movement of the reciprocatory carriage.

3. In a machine of the character described, a support, a rotatable work holder, a rotatable grinding wheel mounted to travel across the work upon said holder, means for adjusting the work holder toward and from the grinding wheel, and means independent of the first mentioned adjusting means for adjusting the work holder angularly with respect to the grinding wheel.

4. In a machine of the character described, a support, a shaft carrying a work holder, a pivoted bearing for one end of said shaft, a bearing for the other end of said shaft slidable in an arm concentric with the pivot of the first mentioned bearing and a rotatable grinding wheel to travel across the work on said holder.

5. In a machine of the character described, a support, a shaft carrying a work holder, a pivoted bearing for one end of said shaft, a bearing for the other end of said shaft slidable in an arc concentric with the pivot of the first mentioned bearing, a rotatable grinding wheel to travel across the work on said holder, and a screw sleeve arranged in the threaded opening in one of said bearings and having a swiveled connection with said shaft.

6. In a machine of the character described, a support, bearings thereon, a shaft rotatable in said bearings and carrying a work holder, a screw sleeve swiveled on said shaft and arranged in a threaded opening in one of said bearings, and a rotatable grinding wheel to travel across the work on said holder.

7. In a machine of the character described, a support, a rotatable work holder, a shaft carrying a grinding wheel, a slidable carriage having a bearing for said shaft, a feed screw for operating said carriage, and a rotary driving element for said shaft keyed to rotate therewith but adapted to have said shaft slide longitudinally therethrough.

8. In a machine of the character described, a support, bearings thereon, one being pivoted and the other slidably adjustable in an arc concentric with the pivot of the first mentioned one, a shaft rotatable in said bearings, means for adjusting said shaft longitudinally in said bearings, a work holder upon one end of said shaft, guides disposed in a plane substantially at right angles to the longitudinal axis of said shaft, a reciprocatory carriage on said guides and provided with a nut, a rotary grinding wheel upon said carriage, a shaft for said wheel, a bearing for the last mentioned shaft upon said carriage, a stationary bearing in which the grinding wheel shaft is mounted for reciprocation, a rotary driving element keyed to rotate with the grinding wheel shaft but adapted to have said shaft slide longitudinally therethrough, a feed screw engaged with the nut on the carriage, a main drive shaft and driving connections between the latter and said element, said work holder carrying shaft and said screw.

9. In a machine of the character described, a support, bearings thereon, one being pivoted and the other slidably adjustable in an arc concentric with the pivot of the first mentioned one, a shaft rotatable in said bearings, means for adjusting said shaft longitudinally in said bearings, a work holder upon one end of said shaft, guides disposed in a plane substantially at right angles to the longitudinal axis of said shaft, a reciprocatory carriage on said guides and provided with a nut, a rotary grinding wheel upon said carriage, a shaft for said wheel, a bearing for the last mentioned shaft upon said carriage, a stationary bearing in which the grinding wheel shaft is mounted for reciprocation, a rotary driving element keyed to rotate with the grinding wheel shaft but adapted to have said shaft slide longitudinally therethrough, a feed screw engaged with the nut on the carriage, a main drive shaft, means for rotating said element from the latter, another shaft driven from the main drive shaft by a worm gearing, a driving connection between the last mentioned shaft and the work holder carrying shaft and a reversing friction gear between said last mentioned shaft and the feed screw.

In testimony whereof I hereunto affix my signature in the presence of two witnesses.

ALFRED L. LAWING.

Witnesses:
B. W. McDOWELL,
J. B. LAWING.